(12) United States Patent
Cheon et al.

(10) Patent No.: US 8,338,021 B2
(45) Date of Patent: Dec. 25, 2012

(54) BATTERY MODULE

(75) Inventors: Sang-Eun Cheon, Yongin-si (KR); Tatsuya Hashimoto, Yongin-si (KR)

(73) Assignee: SB LiMotive Co., Ltd., Yongin-si (KR)

( * ) Notice: Subject to any disclaimer, the term of this patent is extended or adjusted under 35 U.S.C. 154(b) by 344 days.

(21) Appl. No.: 12/813,377

(22) Filed: Jun. 10, 2010

(65) Prior Publication Data

US 2011/0039147 A1 Feb. 17, 2011

(30) Foreign Application Priority Data

Aug. 14, 2009 (KR) .................. 10-2009-0075427

(51) Int. Cl.
*H01M 2/24* (2006.01)
*H01M 10/50* (2006.01)
*H01M 6/42* (2006.01)

(52) U.S. Cl. ........... 429/158; 429/62; 429/159; 429/160

(58) Field of Classification Search .............. 429/61, 429/62, 158–161, 178; 439/500, 627
See application file for complete search history.

(56) References Cited

U.S. PATENT DOCUMENTS

| 7,511,456 | B2 | 3/2009 | Lee et al. |
| 2005/0077878 | A1 | 4/2005 | Carrier et al. |
| 2008/0118824 | A1 | 5/2008 | Oguma et al. |
| 2008/0241671 | A1 | 10/2008 | Cherng |

FOREIGN PATENT DOCUMENTS

| JP | 10-214612 | | 8/1998 |
| JP | 2003-106775 | A | 4/2003 |
| JP | 2003-132873 | A | 5/2003 |
| JP | 2004-319463 | A | 11/2004 |
| JP | 2006-019140 | A | 1/2006 |
| JP | 2007-250301 | A | 9/2007 |
| JP | 2008-153204 | | 7/2008 |
| JP | 2008-251352 | A | 10/2008 |
| JP | 2009-535777 | | 10/2009 |
| KR | 10-2006-0116424 | | 11/2006 |
| WO | WO 2006/118386 | A1 | 11/2006 |
| WO | WO 2011/007535 | A1 | 1/2011 |

OTHER PUBLICATIONS

KIPO Office action dated Jan. 12, 2011, for Korean priority Patent application 10-2009-0075427.
Machine English Translation of JP 2006-019140, 7 pages.
Machine English Translation of JP 2008-251352, 15 pages.
KIPO Notice of Allowance dated Sep. 23, 2011 for Korean priority Patent application 10-2009-0075427, 5 pages.
Extended European Search Report dated Oct. 7, 2010 in corresponding EP application No. 10171554.8.
Japanese Office action dated Aug. 14, 2012, for corresponding Japanese Patent application 2010-120590, (1 page).
Patent Abstracts of Japan, and English machine translation for Japanese Publication 10-214612 listed above, (7 pages).

*Primary Examiner* — Ula C. Ruddock
*Assistant Examiner* — Thomas H. Parsons
(74) *Attorney, Agent, or Firm* — Christie, Parker & Hale, LLP

(57) ABSTRACT

A battery module including a plurality of rechargeable batteries including a case and terminals protruding outside of the case; a first connecting member electrically connecting first terminals of neighboring rechargeable batteries and including a fuse unit configured to disconnect the first terminals of the neighboring rechargeable batteries when an overcurrent is generated; a plurality of second connecting members electrically connecting second terminals of the neighboring rechargeable batteries to terminals of connected rechargeable batteries; and a shorting member configured to generate a short circuit by connecting neighboring second connecting members to each other.

20 Claims, 10 Drawing Sheets

BATTERY MODULE

CROSS-REFERENCE TO RELATED APPLICATION

This application claims priority to and the benefit of Korean Patent Application No. 10-2009-0075427 filed in the Korean Intellectual Property Office on Aug. 14, 2009, the entire content of which is incorporated herein by reference.

BACKGROUND

1. Field

Aspects of embodiments of the present invention relate to a battery module, and more particularly, to a battery module with an improved safety apparatus structure.

2. Description of the Related Art

A rechargeable battery can be repeatedly charged and discharged, unlike a primary battery that cannot be recharged. A low-capacity rechargeable battery is used for portable small-sized electronic devices, such as mobile phones, notebook computers, and camcorders. A large-capacity battery is widely used as a power source for driving motors, such as for hybrid vehicles.

Recently, a high-power rechargeable battery using a non-aqueous electrolyte of a high energy density has been developed. The high-power battery module is configured of a large-capacity rechargeable battery by coupling a plurality of rechargeable batteries in series to be used for devices requiring a large amount of power, for example for driving a motor such as for an electric vehicle.

Further, one large-capacity battery module is usually configured of a plurality of rechargeable batteries connected in series, wherein the rechargeable battery may be formed in a cylindrical shape, a square shape, or another shape.

Each rechargeable battery includes an electrode assembly having positive and negative electrodes with a separator disposed therebetween, a case for installing the electrode assembly therein, a cap assembly closing and sealing the case, and an electrode terminal electrically connected to the electrode assembly and protruding through the cap assembly to the outside.

In each rechargeable battery, the positive terminal and the negative terminal are alternately arranged with the positive terminal and the negative terminal of a neighboring rechargeable battery to be coupled in series. Also, a connection member is connected to the positive terminal of one rechargeable battery and the negative terminal of the neighboring rechargeable battery (e.g., connected with a nut) such that the rechargeable batteries are coupled in series through the connection member.

In this battery module, when the rechargeable battery is deteriorated, the rechargeable battery may combust or explode. Particularly, when a gas from the electrolyte solution is generated such that internal pressure of the rechargeable battery is increased, or when the temperature of the rechargeable battery is substantially increased, the rechargeable battery may combust or explode.

The above information disclosed in this Background section is only for enhancement of understanding of the background of the described technology and therefore it may contain information that does not form the prior art that is already known in this country to a person of ordinary skill in the art.

SUMMARY

According to an aspect of embodiments of the present invention, a battery module has improved safety.

According to one embodiment of the present invention, a battery module includes: a plurality of rechargeable batteries including a case and terminals protruding outside of the case; a first connecting member electrically connecting first terminals among the terminals of neighboring rechargeable batteries of the plurality of rechargeable batteries and including a fuse unit configured to disconnect the first terminals of the neighboring rechargeable batteries when an overcurrent is generated; a plurality of second connecting members electrically connecting second terminals among the terminals of the neighboring rechargeable batteries to terminals of connected rechargeable batteries of the plurality of rechargeable batteries; and a shorting member configured to generate a short circuit by connecting neighboring second connecting members of the plurality of second connecting members to each other.

The shorting member may include a shorting plate contactable with the neighboring second connecting members for inducing the short circuit, and a driver coupled to the shorting plate and configured to move the shorting plate to contact the neighboring connecting members. The shorting plate may be between the neighboring second connecting members.

The driver may include a wrinkled plate arranged between the neighboring rechargeable batteries. The driver may include a curved plate arranged between the neighboring rechargeable batteries.

The driver may include two curved plates arranged between the neighboring rechargeable batteries and coupled to each other, and central portions of the curved plates are spaced apart from each other. The driver may include a bimetal or a shape memory alloy and be fixed to the case.

The shorting plate may be rotatable with respect to the driver. A rechargeable battery of the plurality of rechargeable batteries may include a cap plate coupled to the case, and the driver may include a bimetal or a shape memory alloy and be fixed to the cap plate.

A rechargeable battery of the plurality of rechargeable batteries may include a cap plate coupled to the case, and the shorting member may include a hinge fixed to the cap plate, a driver rotatable with respect to the hinge, and a shorting plate fixed to the driver and a shorting plate contactable with the neighboring second connecting members for electrically connecting the neighboring second connecting members to each other.

The shorting member may further include an assistance bar coupled to the driver and extending in a direction in which the rechargeable batteries are stacked, and the cap plate may include an expansion unit configured to expand, and the assistance bar may be contactable with the expansion unit when an internal pressure of the rechargeable battery is increased.

The first connecting member and the second connecting members may electrically connect a positive terminal among the terminals of one rechargeable battery of the plurality of rechargeable batteries and a negative terminal among the terminals of a neighboring rechargeable battery of the plurality of rechargeable batteries, and one terminal among the positive terminal and the negative terminal of the one rechargeable battery may contact the first connecting member and the other terminal of the one rechargeable battery may contact one of the second connecting members.

The shorting member may include a hinge fixed to a side surface of a rechargeable battery of the plurality of rechargeable batteries; a driver rotatable with respect to the hinge and connected in a height direction of the rechargeable battery; and a shorting plate fixed to the driver and contactable with the neighboring second connecting members for electrically connecting the neighboring second connecting members to each other. The case may include an expansion unit having a thickness that is thinner than that of a remaining portion of the case. The first connecting member may be made of one plate, and the fuse unit may have a smaller cross-sectional area than that of a remaining portion of the one plate.

According to another embodiment of the present invention, a battery module includes: a plurality of rechargeable batteries including a case and terminals protruding outside of the case; a plurality of connecting members electrically connecting terminals of neighboring rechargeable batteries of the plurality of rechargeable batteries to each other; and a shorting member configured to generate a short circuit by connecting neighboring connecting members of the plurality of connecting members to each other, wherein the shorting member includes a shorting plate contactable with the neighboring connecting members for generating the short circuit, and a driver coupled to the shorting plate and configured to move the shorting plate to contact the neighboring connecting members.

The driver may include a wrinkled plate arranged between the rechargeable batteries. The driver may include a curved plate arranged between the rechargeable batteries. The driver may include a bimetal or a shape memory alloy. The shorting member may further include a hinge fixed to an outer portion of one of the rechargeable batteries, and the driver may be rotatable about the hinge.

As described above, according to an aspect of embodiments of the present invention, the short circuit of the connecting member is induced by installing the shorting member thereby generating an overcurrent such that the charge and the discharge of the battery in which a disorder is generated is stopped, and accordingly the safety is improved.

According to another aspect of embodiments of the present invention, the connection is blocked when generating the overcurrent by installing the fuse unit at the connecting member such that the charge and the discharge of the battery in which the disorder is generated is stopped, and accordingly the safety is improved.

BRIEF DESCRIPTION OF THE DRAWINGS

The above and other features and advantages will become more apparent to those of ordinary skill in the art by describing in detail some exemplary embodiments of the present invention with reference to the attached drawings.

DESCRIPTION OF REFERENCE NUMERALS INDICATING SOME ELEMENTS IN THE DRAWINGS

Figure 1:
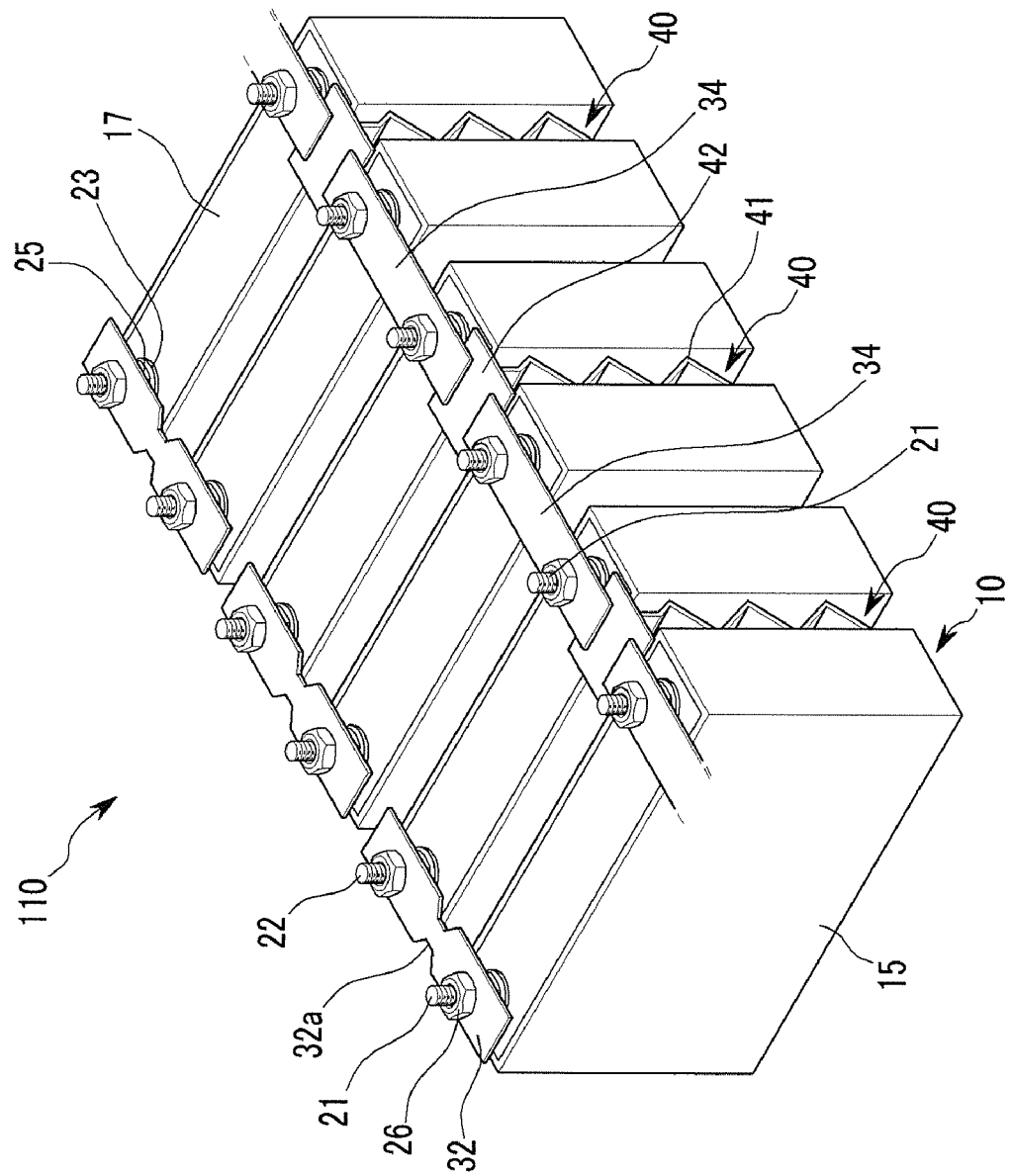
FIG. 1 is a perspective view of a battery module according to an exemplary embodiment of the present invention.

| | |
|---|---|
| 110, 120, 130, 140, 150, 160, 170: | battery module |
| 10: | rechargeable battery |
| 12, 14, 18, 19: | expansion unit |
| 15: | case |
| 17: | cap plate |
| 21, 22: | terminal |
| 32: | first connecting member |
| 32a: | fuse unit |
| 34: | second connecting member |
| 40, 50, 60, 70, 80, 91, 96: | shorting member |
| 41, 51, 61, 71, 81, 92, 97: | driver |
| 42, 52, 62, 72, 82, 93, 98: | shorting plate |
| 54, 64: | coupling rod |
| 73, 85, 95: | hinge |
| 84: | assistance bar |

DETAILED DESCRIPTION

The present invention will be described more fully hereinafter with reference to the accompanying drawings, in which some exemplary embodiments of the invention are shown. As those skilled in the art would realize, the described exemplary embodiments may be modified in various different ways, all without departing from the spirit or scope of the present invention. The drawings and description are to be regarded as illustrative in nature and not restrictive. Like reference numerals designate like elements throughout the specification.

Figure 2:
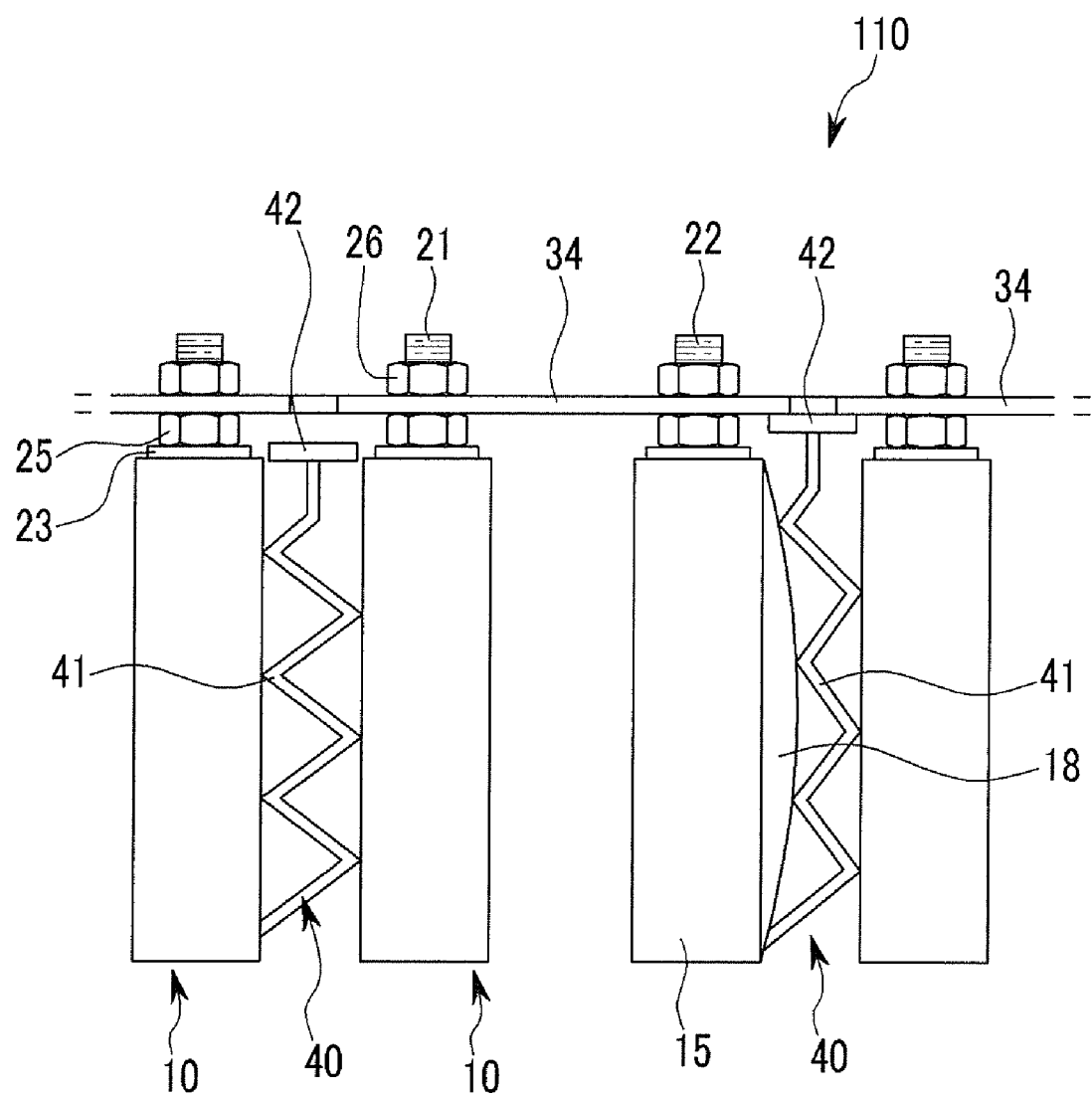
FIG. 2 is a lateral view of a portion of the battery module of FIG. 1.

FIG. 1 is a perspective view of a battery module according to one exemplary embodiment of the present invention, and FIG. 2 is a lateral view of a portion of the battery module shown in FIG. 1.

Referring to FIG. 1 and FIG. 2, a battery module 110 according to one embodiment includes a plurality of rechargeable batteries 10 having a positive terminal 21 and a negative terminal 22, connecting members 32 and 34 electrically connecting the terminals 21 and 22 (hereinafter, "the terminal" refers to the positive terminal and the negative terminal) of the neighboring rechargeable batteries 10 to each other, and nuts 25 and 26 fixing the connecting members 32 and 34 to the terminals 21 and 22.

The rechargeable battery 10 according to one embodiment has a prismatic shape, and includes a case 15 receiving an electrode assembly (not shown) and a cap plate 17 closing and sealing the case 15. In one embodiment, the prismatic battery is one example of the rechargeable battery; however, embodiments of the rechargeable battery of the present invention are not limited thereto, and in other embodiment, the rechargeable battery may have a cylindrical or other shape.

Also, in one embodiment, the terminals 21 and 22 are installed to be protruded outside of the cap plate 17, have a screw thread on an external circumferential surface thereof, and are fixed by the nuts 25 and 26 on the cap plate 17. In one embodiment, the terminals 21 and 22 have a generally cylindrical rod shape.

In one embodiment, a gasket 23 for insulating between the cap plate 17 and the terminals 21 and 22 is installed between the cap plate 17 and the terminals 21 and 22.

In one embodiment, the first nut 25 is first installed on the terminals 21 and 22 protruded outside of the cap plate 17, the connecting members 32 and 34 are installed on the first nut 25, and the second nut 26 is installed on the connecting members 32 and 34 thereby fixing the connecting members 32 and 34.

In the above-described embodiment, the connecting members 32 and 34 are fixed to the terminals 21 and 22 by the nuts 25 and 26; however, embodiments of the present invention are not limited thereto and, in other embodiments, the connecting members 32 and 34 may be fixed to the terminals 21 and 22 through welding or any other suitable method or device.

In one embodiment, the rechargeable batteries 10 are coupled in series to form the battery module 110, wherein the positive terminal 21 and the negative terminal 22 of neighboring rechargeable batteries 10 are disposed to be near each other, and the connecting members 32 and 34 are coupled to the positive terminal 21 of one rechargeable battery 10 and the negative terminal 22 of the neighboring rechargeable battery 10.

In one embodiment, the connecting members 32 and 34 have a long plate shape, and a hole in which the terminals 21 and 22 are inserted is formed at both ends of the connecting members 32 and 34. After the first nuts 25 are installed on the terminals 21 and 22, the connecting members 32 and 34 are installed by inserting the terminals through the holes at both ends, and subsequently the second nuts 26 are coupled to the terminals 21 and 22 on the upper portion of the connecting members 32 and 34 for fixing the connecting members 32 and 34. The second nut 26 has a function of pressing the connecting members 32 and 34 toward the first nut 25. Accordingly, the current generated in the electrode assembly is transmitted to the connecting members 32 and 34 through the positive terminal 21 and the first nut 25.

The connecting members 32 and 34 include the first connecting member 32 having a fuse unit 32a that blocks the connection when an overcurrent is generated, and the second connecting member 34 electrically connecting the terminals 21 and 22 that are not connected with the first connecting member 32.

In one embodiment, if the positive terminal 21 of one rechargeable battery 10 is connected to a neighboring rechargeable battery 10 by the first connecting member 32, the negative terminal 22 is connected to another neighboring rechargeable battery 10 by the second connecting member 34. In one embodiment, the first connecting members 32 are installed at one side edge in the battery module 110, and the second connecting members 34 are installed at the other side edge.

When an overcurrent is generated, in one embodiment, the fuse unit 32a that is formed in a central part of the length direction of the first connecting member 32 disconnects the electric connection. The fuse unit 32a according to one embodiment includes a notched structure having a smaller cross-section than the remaining portion. For example, in one embodiment, the fuse unit 32a has a smaller width than that of the remaining portion (see FIG. 1) or, in another embodiment, may have a thinner thickness than that of the remaining portion. Also, in another embodiment, the first connecting member 32 may be divided into two plates, and an additional fuse unit connecting the two plates may be installed at a central part thereof. Further, in another embodiment, the fuse unit 32a may be formed at a portion other than the central part of the length direction of the first connecting member 32.

The battery module 110 according to one exemplary embodiment includes a shorting member 40 that is configured to be deformed and electrically connect neighboring second connecting members 34 to each other when an internal pressure of the rechargeable battery 10 is increased. That is, the shorting member 40 is configured to control the connection between the second connecting members 34 and thereby generate a short circuit.

The shorting member 40, in one embodiment, includes a driver 41 inserted between adjacent rechargeable batteries 10 connected through the first connecting member 32 and formed of a wrinkled or corrugated plate, and a shorting plate 42 installed at one end of the driver 41. The driver 41, in one embodiment, is made of a plate having a cross-section having a triangle waveform, a sine waveform, an arc waveform, or any other suitable shape. Further, in one embodiment, the driver 41 is made of a material having elasticity, and may be made of a metal, a polymer, or any other suitable material.

The shorting plate 42, in one embodiment, is installed at an upper portion of the driver 41 and is disposed parallel or substantially parallel to the second connecting members 34 between neighboring, or adjacent, second connecting members 34.

In one embodiment, if a large amount of gas is generated in the rechargeable battery 10, a side surface of the case 15 is protruded thereby forming an expansion unit 18, and the expansion unit 18 presses against the driver 41 such that the wrinkled plate becomes flatter and the shorting plate 42 is forced upward to electrically connect the neighboring second connecting members 34 to each other.

In one embodiment, the thickness of the surface of the case 15 facing toward the driver 41 is thinner than at other portions of the case 15 such that the case 15 is configured to be expanded at the surface of the case 15 facing toward the driver 41 and in the direction toward the driver 41. Also, in one embodiment, a plate having a large elongation ratio is installed at the surface of the case 15 facing toward the driver 41 to easily deform the wrinkled plate of the driver 41.

When the neighboring second connecting members 34 are electrically connected to each other due to the deformation of the shorting member 40, the positive terminal 21 and the negative terminal 22 of the neighboring rechargeable batteries 10 are connected such that the amount of current is rapidly increased. When a current of 20 A flows in the connecting member under normal operation, if the second connecting members 34 are electrically connected to each other, a current of about 1000 A to 2000 A flows in an instant. In one embodiment, the fuse unit 32a of the first connecting member 32 is melted by the heat generated due to the overcurrent, and the first connecting member 32 is disconnected such that the electrical connection is interrupted.

In the above-described embodiment, the fuse unit 32a is formed; however, in another embodiment, the fuse unit 32a, as described above, may not be formed, and a different, or preexisting, member may be melted by the overcurrent such that the electrical connection is interrupted. For example, in other embodiments, the overall thickness of the first connecting member 32 may be thin, or a member of the rechargeable battery may be cut such that the current is interrupted.

As described above, if the first connecting member 32 is melted, the current can no longer flow through the first connecting member 32, and instead bypasses two rechargeable batteries 10 through the second connecting member 34 and the shorting plate 42. Accordingly, in this condition, the expanded rechargeable battery 10 does not have the charge and discharge reactions, such that explosion or combustion due to expansion of the rechargeable battery 10 is prevented or substantially prevented.

According to one embodiment, two rechargeable batteries 10 may be removed from use; however, the charge and discharge may be continuously executed under a reduced voltage output state such that the battery module 110 may still function. The above aspect of embodiments of the present invention is important in a case in which the battery module 110 should not stop functioning and should be continuously used. For example, in a conventional battery module applied to an electric vehicle or a hybrid vehicle, one rechargeable battery may malfunction such that the entire battery module 110 may not be used, and the vehicle will suddenly stop and may cause a traffic accident. However, in the above-described embodiment of the present invention, when a malfunction is generated in one rechargeable battery 10, the remaining part of the battery module 110 may be used excluding the malfunctioning rechargeable battery 10 such that the vehicle may be driven to an inspection station.

Figure 3:
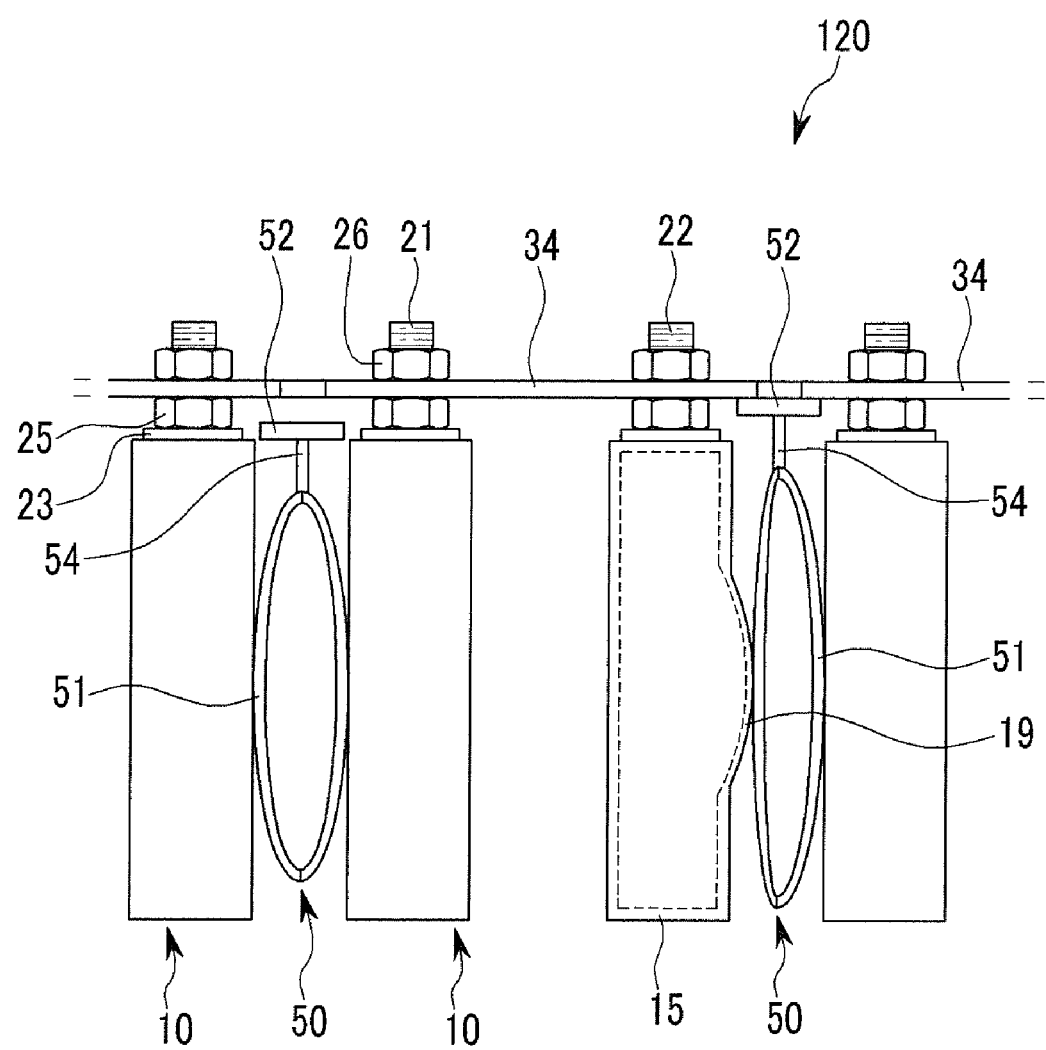
FIG. 3 is a lateral view of a battery module according to another exemplary embodiment of the present invention.

FIG. 3 is a lateral view of a battery module according to another exemplary embodiment of the present invention.

Referring to FIG. 3, a battery module 120 according to one embodiment is the same as the battery module 110 described above except for the structure of a shorting member 50. Therefore, the description of same or similar features will not be repeated.

The battery module 120 according to one embodiment includes the shorting member 50 disposed between the rechargeable batteries 10 and configured to electrically connect the second connecting members 34.

The shorting member 50, in one embodiment, includes a driver 51 including two curved plates of which central portions are separated from one another to be convex, a shorting plate 52 movable in the up-and-down directions by the driver 51, and a coupling rod 54 connecting the shorting plate 52 and the driver 51.

The driver 51, in one embodiment, is formed of two curved plates that are curved, for example, with an arc shape, and a lower portion and an upper portion of the curved plates contact and are contacting or adhered to each other, while the central portions are separated from each other. Accordingly, in one embodiment, both sides of the driver 51 are convex and protrude outward, and a protruded portion contacts the outer surface of the rechargeable battery 10.

In the above-described embodiment, if the outer surface of the rechargeable battery 10 is expanded, the curved plates are flattened or partially flattened such that the shorting plate 52 is raised upward to electrically connect neighboring second connecting members 34 to each other.

In one embodiment, an expansion unit 19 having a thickness that is thinner than that of other portions of the case 15 is formed on one side of the case 15 facing the driver 51, and when the internal pressure of the rechargeable battery 10 is increased, the case 15 is protruded outward at the expansion unit 19 and presses against the driver 51.

Figure 4:
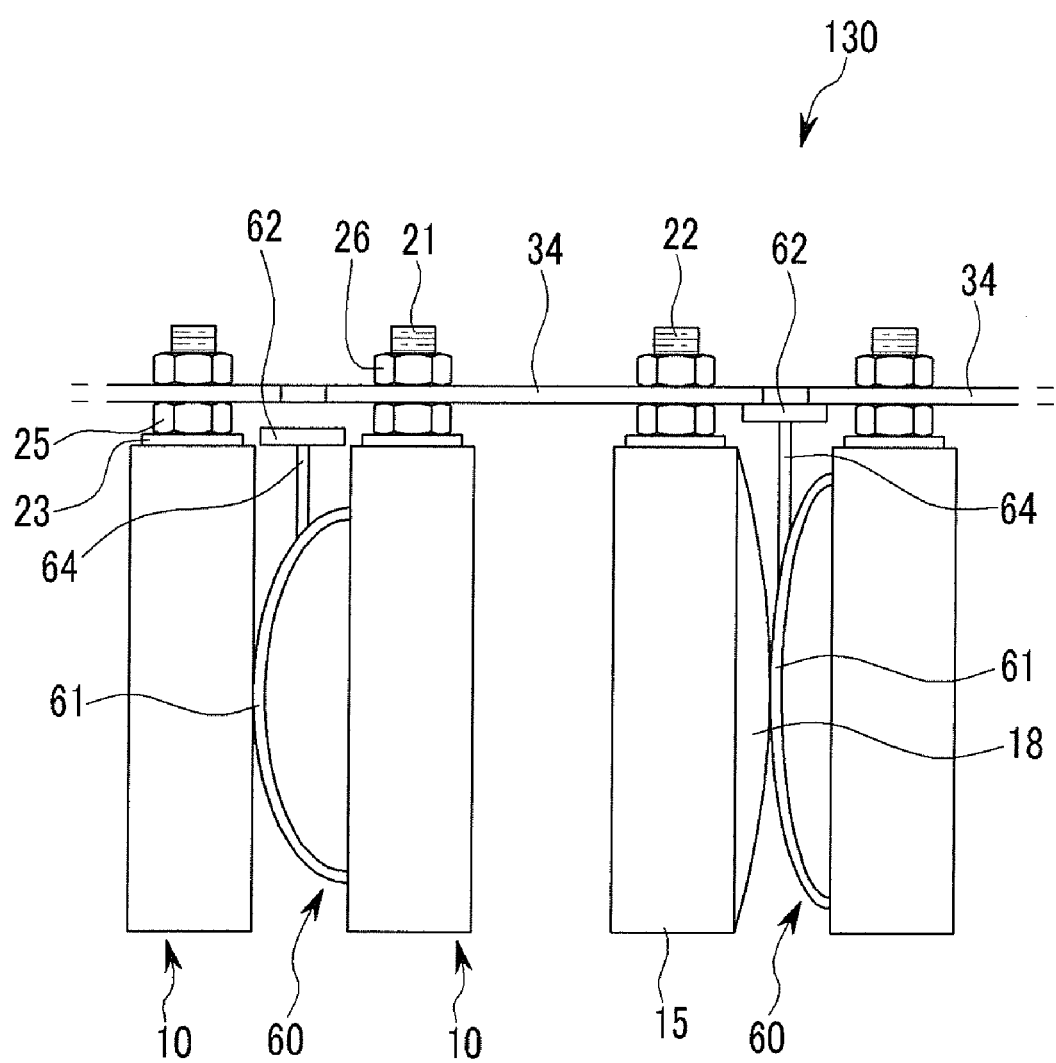
FIG. 4 is a lateral view of a battery module according to another exemplary embodiment of the present invention.

FIG. 4 is a lateral view of a battery module according to another exemplary embodiment of the present invention.

Referring to FIG. 4, a battery module 130 according to one embodiment is the same as the battery module 110 described above except for the structure of a shorting member 60. Therefore, the description of same or similar features will not be repeated.

The battery module 130 according to one embodiment includes the shorting member 60 disposed between the rechargeable batteries 10 and configured to electrically connect the second connecting members 34.

The shorting member 60, in one embodiment, includes a driver 61 including one curved plate, a shorting plate 62 movable in the up-and-down directions by the driver 61, and a coupling rod 64 connecting the shorting plate 62 and the driver 61.

The curved plate of the driver 61, in one embodiment, has a cross-section having an arc shape, an upper end and a lower end contacting one rechargeable battery 10, and a convex and protruded portion at a central part thereof contacting the neighboring rechargeable battery 10.

Accordingly, if the case 15 of the rechargeable battery 10 is expanded such that the expansion unit 18 is formed at the case 15 at a side facing the driver 61, the curved plate of the driver 61 is flattened or partially flattened and the shorting plate 62 is raised upward to electrically connect neighboring second connecting members 34 to each other.

Figure 5:
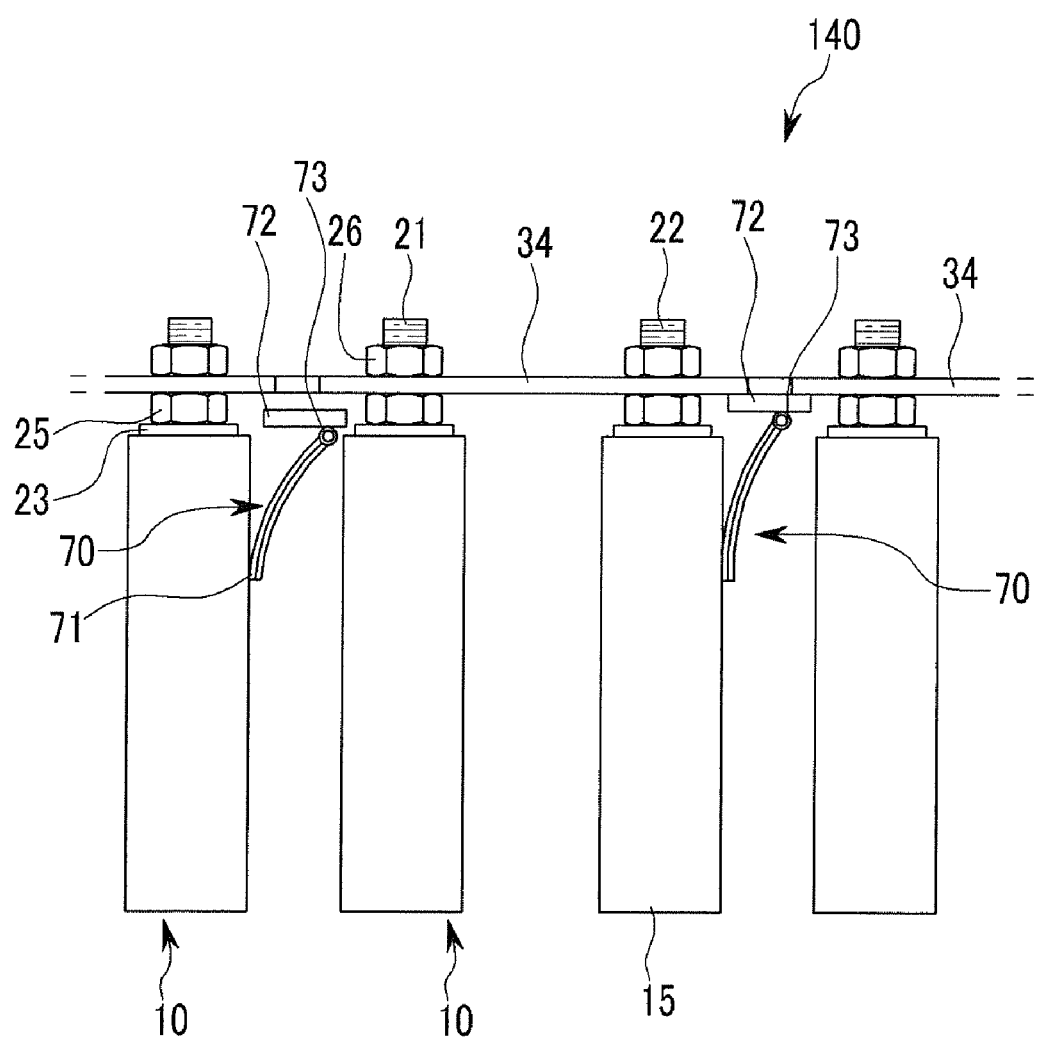
FIG. 5 is a lateral view of a battery module according to another exemplary embodiment of the present invention.

FIG. 5 is a lateral view of a battery module according to another exemplary embodiment of the present invention.

Referring to FIG. 5, a battery module 140 according to one embodiment is the same as the battery module 110 described above except for the structure of a shorting member 70. Therefore, the description of same or similar features will not be repeated.

The battery module 140 according to one embodiment includes the shorting member 70 disposed between the rechargeable batteries 10 and configured to electrically connect the second connecting members 34 to each other upon malfunction of the rechargeable battery 10.

The shorting member 70, in one embodiment, is attached to a side surface of the case 15 of a rechargeable battery 10 and includes a driver 71 made of a bimetal or shape memory alloy and a shorting plate 72 attached to the driver 71. In one embodiment, the driver 71 is attached to the side surface of the case 15 facing toward the neighboring rechargeable battery 10, and the shorting plate 72 is attached to an upper portion of the driver 71.

As is known to a person of ordinary skill in the art, the curvature of a bimetal or a shape memory alloy is changed according to a change of temperature. In one embodiment, the driver 71 initially has a curved shape, and if the temperature of the outer surface of the case 15 is increased by at least a reference amount, the driver 71 is flattened or partially flattened and the shorting plate 72 is raised such that the neighboring second connecting members 34 are electrically connected to each other.

The driver 71 and the shorting plate 72, in one embodiment, are connected to each other through a hinge 73 such that the shorting plate 72 is rotatable with respect to the driver 71, and accordingly, the shorting plate 72 is rotated with respect to the driver 71 when the bimetal is flattened or partially flattened such that the shorting plate 72 contacts the second connecting members 34 in a parallel or substantially parallel orientation with the second connecting members 34.

In the above-described embodiment, where the driver 71 is made of the bimetal or the shape memory alloy, when the temperature of the rechargeable battery 10 is increased to a dangerous degree, a short circuit is induced such that explosion or combustion of the rechargeable battery 10 is prevented or substantially prevented.

Figure 6:
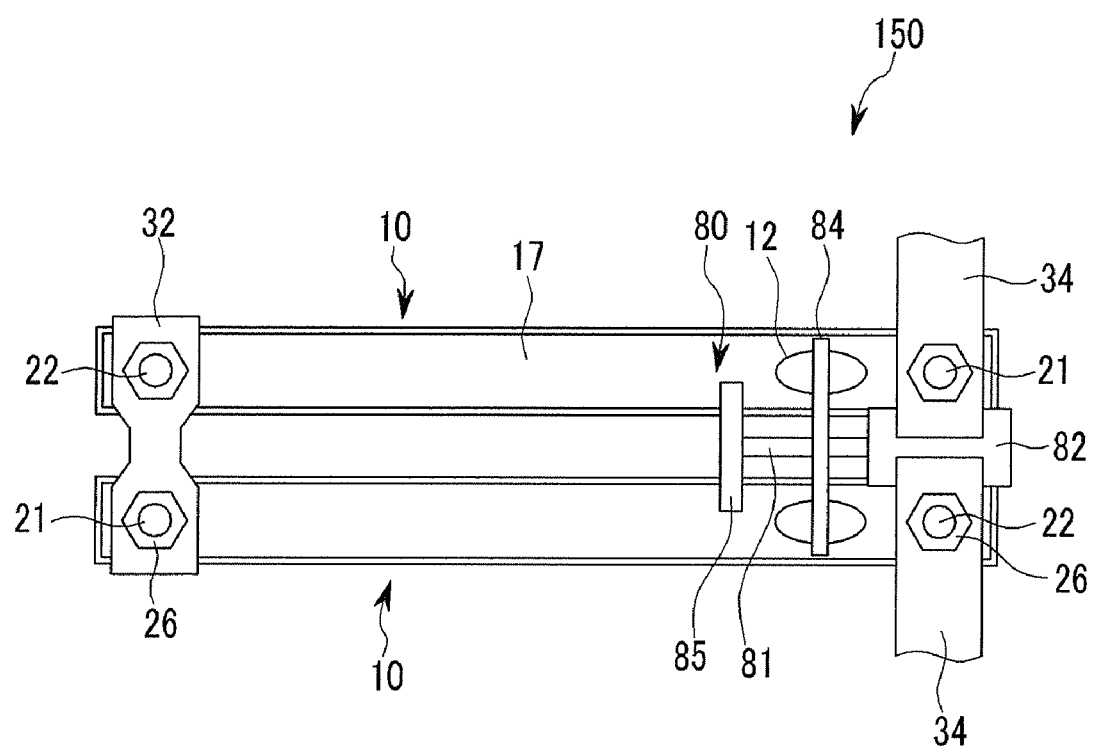
FIG. 6 is a top view of a battery module according to another exemplary embodiment of the present invention.
Figure 7:
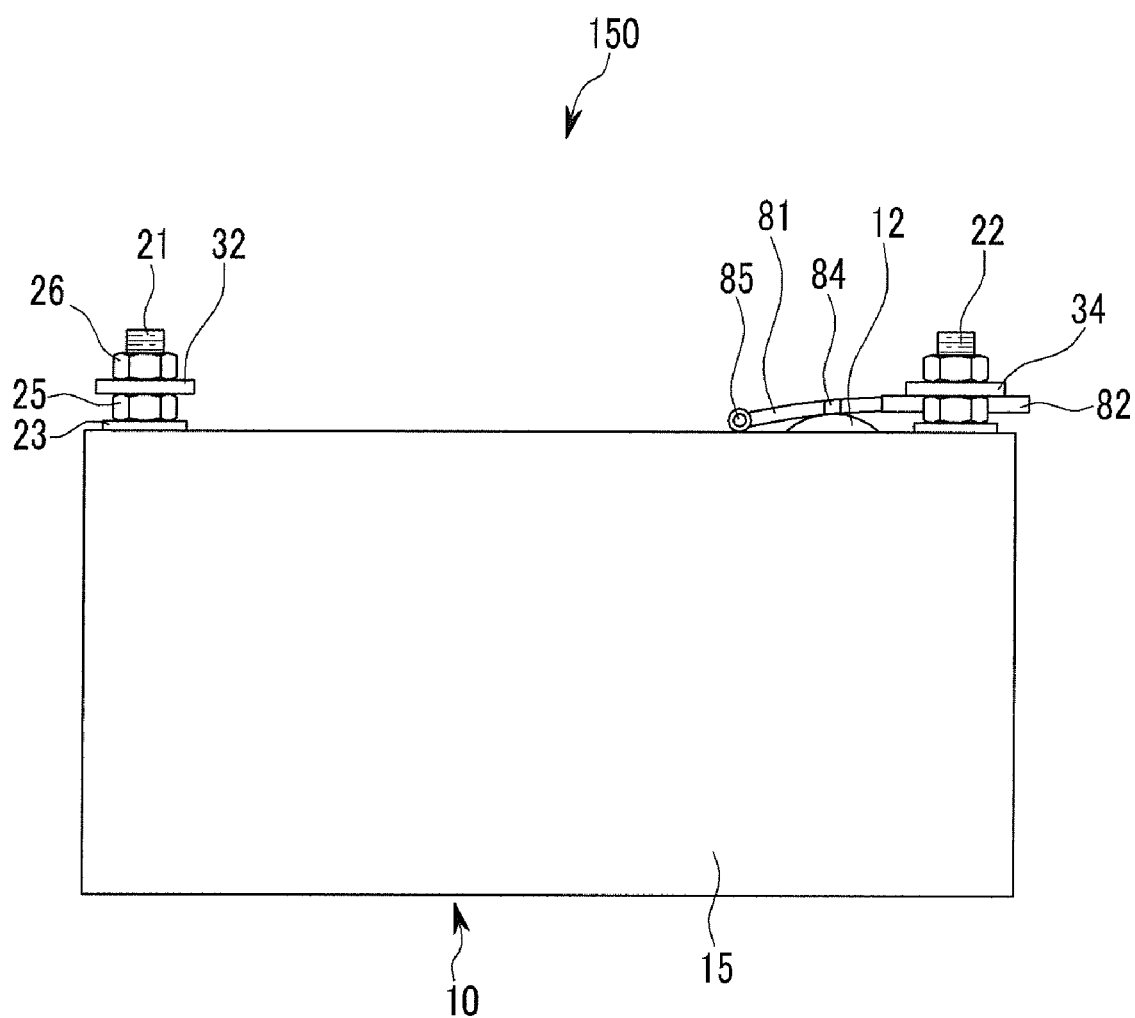
FIG. 7 is a front view of the battery module of FIG. 6.

FIG. 6 is a top view of a battery module according to another exemplary embodiment of the present invention, and FIG. 7 is a front view of the battery module of FIG. 6.

Referring to FIG. 6 and FIG. 7, a battery module 150 according to one embodiment is the same as the battery module 110 described above except for the structure of the shorting member 80. Therefore, the description of same or similar features will not be repeated.

The battery module 150 according to one embodiment includes shorting members 80 disposed between the rechargeable batteries 10 and configured to electrically connect the second connecting members 34 to each other.

The shorting member 80, in one embodiment, includes a hinge 85 fixed to the cap plate 17, a driver 81 installed to be rotatable about the hinge 85, and a shorting plate 82 fixed to the driver 81 for electrically connecting the second connecting members 34 to each other.

In one embodiment, the hinge 85 is fixed and installed to the cap plate 17, the driver 81 connects the hinge 85 and the shorting plate 82, and the driver 81 is coupled to an assistance bar 84 that extends in the direction in which the rechargeable batteries 10 are disposed relative to one another. Further, in one embodiment, the driver 81 has a bar shape and is installed to be close to the assistance bar 84, and the driver 81 and the assistance bar 84 are arranged at right angles.

The cap plate 17, in one embodiment, is configured with an expansion unit 12 that is expandable due to an increase in the internal pressure of the rechargeable battery 10, and the assistance bar 84 is installed to contact the expansion unit 12 of the neighboring rechargeable battery 10.

The expansion unit 12, in one embodiment, is formed with a thin thickness at the cap plate 17, and may be made of a member having an elastic deformation ratio and installed to a hole that is formed at the cap plate 17.

In one embodiment, when the internal pressure of the rechargeable battery 10 is increased, the expansion unit 12 is expanded and raises the assistance bar 84, thereby causing the driver 81 to be raised and rotated about the hinge 85, and accordingly the shorting plate 82 fixed to one end of the driver 81 is also raised. The raised shorting plate 82 is configured to electrically connect the second connecting members 34 to each other.

Figure 8:
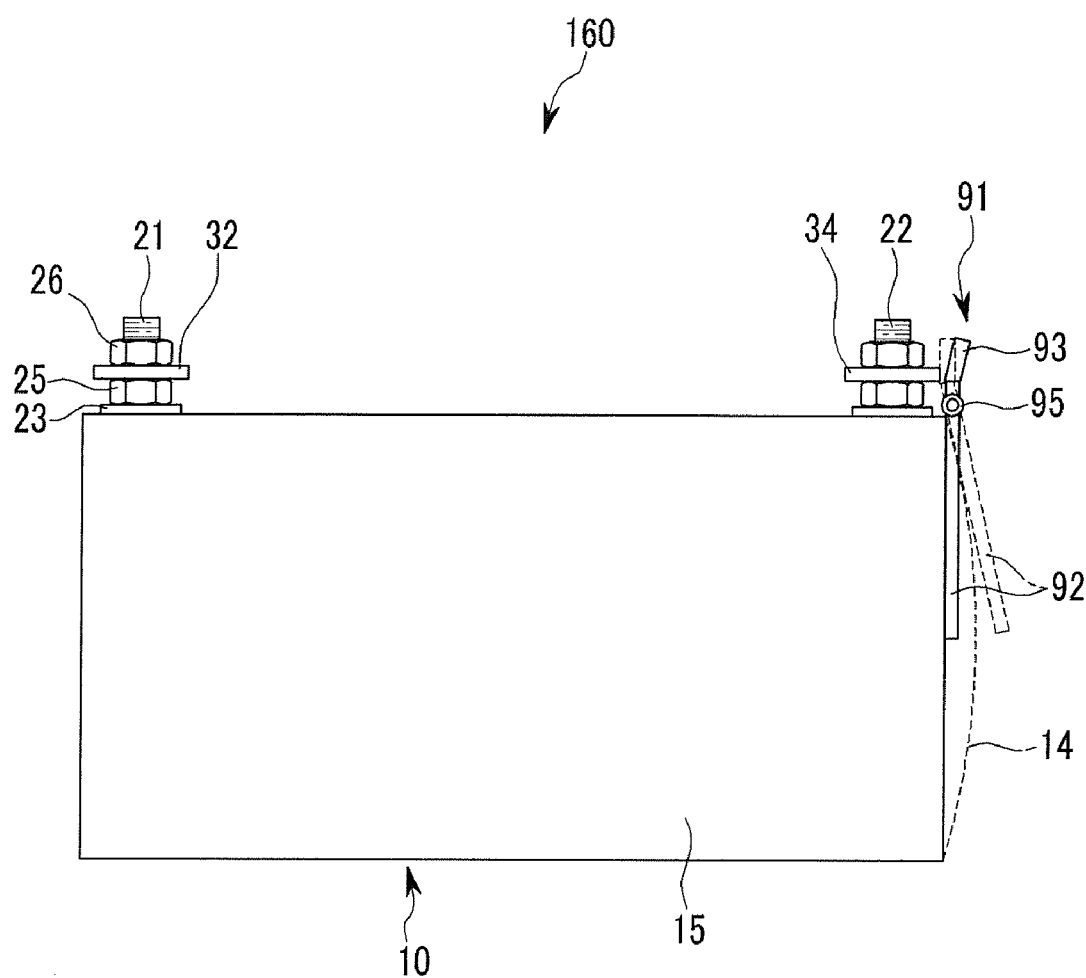
FIG. 8 is a front view of a battery module according to another exemplary embodiment of the present invention.
Figure 9:
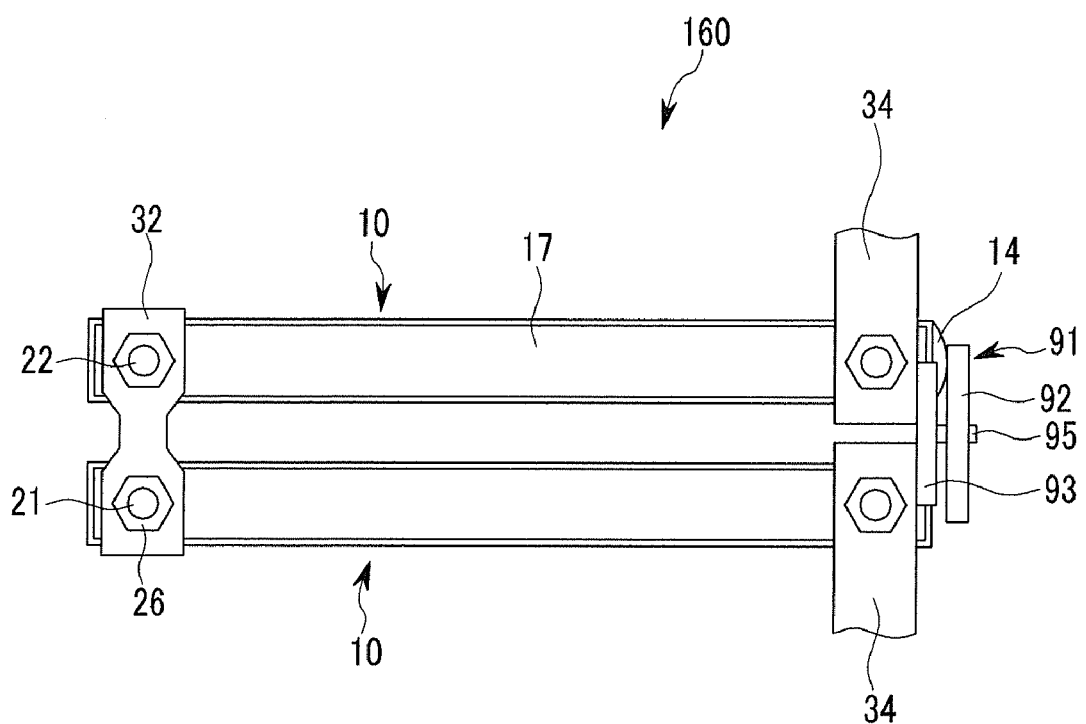
FIG. 9 is a top view of the battery module of FIG. 8.

FIG. 8 is a front view of a battery module according to another exemplary embodiment of the present invention, and FIG. 9 is a top view of the battery module of FIG. 8.

Referring to FIG. 8 and FIG. 9, a battery module 160 according to one embodiment is the same as the battery module 110 described above except for the structure of a shorting member 91. Therefore, the description of same or similar features will not be repeated.

The battery module 160 according to one embodiment includes the shorting member 91 disposed between the rechargeable batteries 10 and configured to electrically connect the second connecting members 34 to each other.

The shorting member 91, in one embodiment, includes a hinge 95 fixed to a side end of the rechargeable battery 10, a driver 92 installed to be rotatable about the hinge 95, and a shorting plate 93 fixed to the driver 92 and configured to electrically connect the second connecting members 34 to each other.

The hinge 95, in one embodiment, is fixed to a side end or a side surface of the cap plate 17, and the driver 92 has a bar shape and is connected in the height direction of the case 15. In another embodiment, the hinge 95 may be fixed to the case 15. Also, in another embodiment, the driver 92 may have any other suitable shape besides a bar shape.

In one embodiment, the driver 92 is arranged at an upper portion of the case 15 and extends at least to about a central part of a side surface of the case 15 in a height direction, and the shorting plate 93 is fixed to an upper portion of the driver 92.

If the internal pressure of the rechargeable battery 10 is increased, an expansion unit 14 protrudes at the side surface of the case 15 such that a lower portion of the driver 92 is pushed outward and raised. Further, the driver 92 is rotated about the hinge 95, and an upper portion of the driver 92 is moved toward the second connecting member 34. Accordingly, the shorting plate 93 fixed to the upper portion of the driver 92 is moved against the second connecting members 34, thereby electrically connecting the second connecting members 34 to each other.

In one embodiment, the one side surface of the case 15 has a thickness that is thinner than that of remaining portions of the case 15 such that the side surface of the case 15 is protruded when the internal pressure of the rechargeable battery 10 is increased.

Figure 10:
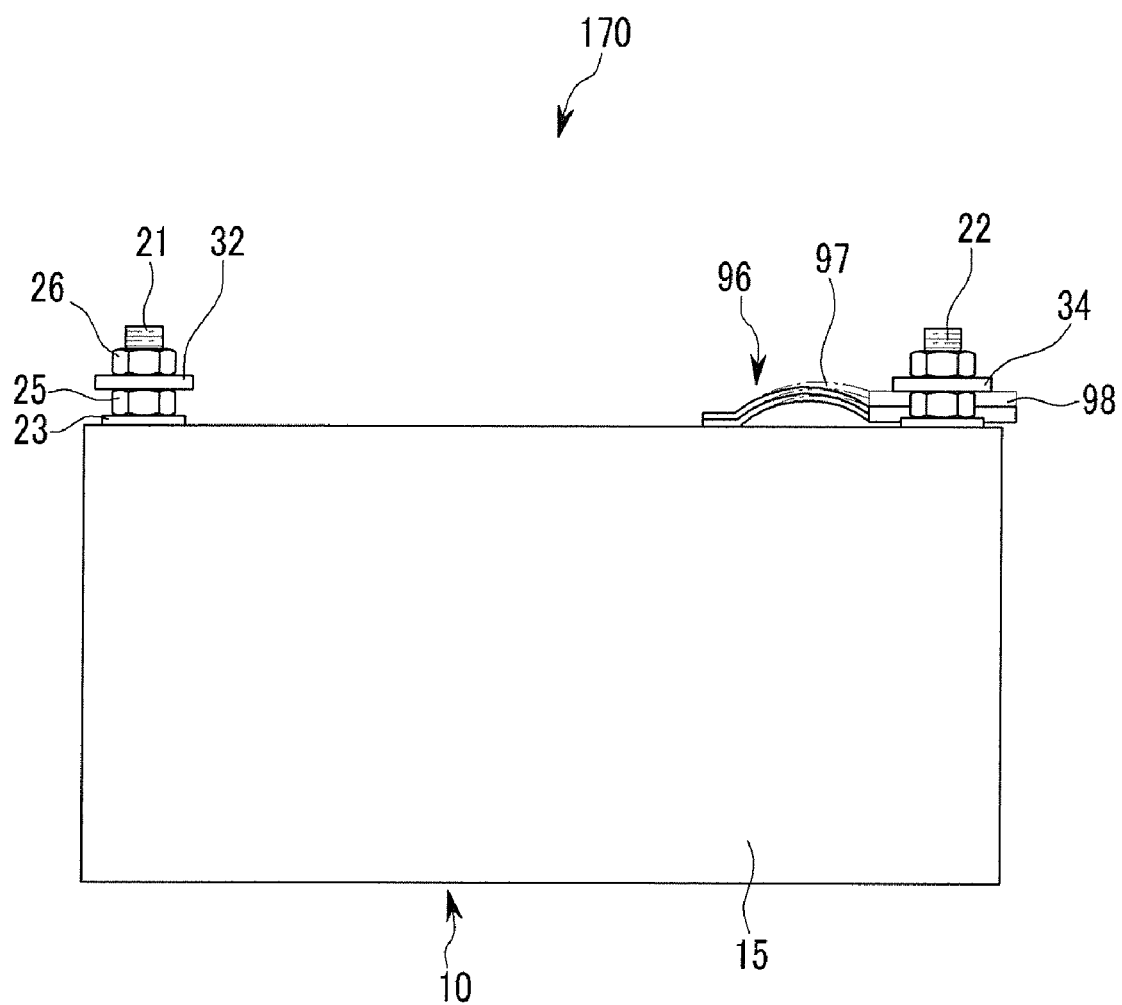
FIG. 10 is a front view of a battery module according to another exemplary embodiment of the present invention.

FIG. 10 is a front view of a battery module according to another exemplary embodiment of the present invention.

Referring to FIG. 10, a battery module 170 according to one embodiment is the same as the battery module 110 described above except for the structure of a shorting member 96. Therefore, the description of same or similar features will not be repeated.

The battery module 170 according to one embodiment includes the shorting member 96 disposed between the rechargeable batteries 10 and configured to electrically connect the second connecting members 34 to each other.

The shorting member 96, in one embodiment, includes a driver 97 fixed on an upper surface of the rechargeable battery 10 and made of a shape memory alloy or a bimetal, and a shorting plate 98 fixed to one end of the driver 97 and configured to electrically connect the neighboring second connecting members 34 to each other.

In one embodiment, one end of the driver 97 is fixed to the cap plate 17, and the other end thereof is fixed to the shorting plate 98 as a free end.

In one embodiment, when the temperature of the cap plate 17 is increased to at least a reference temperature, the shorting plate 98 is raised upward while the driver 97 is spread such that the second connecting members 34 are electrically connected to each other.

While this invention has been described in connection with what is presently considered to be some exemplary embodiments, it is to be understood that the present invention is not limited to the disclosed exemplary embodiments, but, on the contrary, is intended to cover various modifications and equivalent arrangements included within the spirit and scope of the appended claims.

What is claimed is:

1. A battery module comprising:
   a plurality of rechargeable batteries including a case and terminals protruding outside of the case;
   a first connecting member electrically connecting first terminals among the terminals of neighboring rechargeable batteries of the plurality of rechargeable batteries and comprising a fuse unit configured to disconnect the first terminals of the neighboring rechargeable batteries when an overcurrent is generated;
   a plurality of second connecting members electrically connecting second terminals among the terminals of the neighboring rechargeable batteries to terminals of connected rechargeable batteries of the plurality of rechargeable batteries; and
   a shorting member configured to generate a short circuit by connecting neighboring second connecting members of the plurality of second connecting members to each other.

2. The battery module of claim 1, wherein the shorting member comprises a shorting plate contactable with the neighboring second connecting members for inducing the short circuit, and a driver coupled to the shorting plate and configured to move the shorting plate to contact the neighboring connecting members.

3. The battery module of claim 2, wherein the shorting plate is between the neighboring second connecting members.

4. The battery module of claim 2, wherein the driver comprises a wrinkled plate arranged between the neighboring rechargeable batteries.

5. The battery module of claim 2, wherein the driver comprises a curved plate arranged between the neighboring rechargeable batteries.

6. The battery module of claim 2, wherein the driver comprises two curved plates arranged between the neighboring rechargeable batteries and coupled to each other, and central portions of the curved plates are spaced apart from each other.

7. The battery module of claim 2, wherein the driver comprises a bimetal or a shape memory alloy and is fixed to the case.

8. The battery module of claim 7, wherein the shorting plate is rotatable with respect to the driver.

9. The battery module of claim 2, wherein:
a rechargeable battery of the plurality of rechargeable batteries comprises a cap plate coupled to the case, and
the driver comprises a bimetal or a shape memory alloy and is fixed to the cap plate.

10. The battery module of claim 1, wherein:
a rechargeable battery of the plurality of rechargeable batteries comprises a cap plate coupled to the case, and
the shorting member comprises:
a hinge fixed to the cap plate;
a driver rotatable with respect to the hinge; and
a shorting plate fixed to the driver and contactable with the neighboring second connecting members for electrically connecting the neighboring second connecting members to each other.

11. The battery module of claim 10, wherein:
the shorting member further comprises an assistance bar coupled to the driver and extending in a direction in which the rechargeable batteries are stacked, and
the cap plate comprises an expansion unit configured to expand, and the assistance bar is contactable with the expansion unit when an internal pressure of the rechargeable battery is increased.

12. The battery module of claim 1, wherein:
the first connecting member and the second connecting members electrically connect a positive terminal among the terminals of one rechargeable battery of the plurality of rechargeable batteries and a negative terminal among the terminals of a neighboring rechargeable battery of the plurality of rechargeable batteries, and
one terminal among the positive terminal and the negative terminal of the one rechargeable battery contacts the first connecting member and the other terminal of the one rechargeable battery contacts one of the second connecting members.

13. The battery module of claim 1, wherein the shorting member comprises:
a hinge fixed to a side surface of a rechargeable battery of the plurality of rechargeable batteries;
a driver rotatable with respect to the hinge and connected in a height direction of the rechargeable battery; and
a shorting plate fixed to the driver and contactable with the neighboring second connecting members for electrically connecting the neighboring second connecting members to each other.

14. The battery module of claim 1, wherein the case comprises an expansion unit having a thickness that is thinner than that of a remaining portion of the case.

15. The battery module of claim 1, wherein the first connecting member is made of one plate, and the fuse unit has a smaller cross-sectional area than that of a remaining portion of the one plate.

16. A battery module comprising:
a plurality of rechargeable batteries including a case and terminals protruding outside of the case;
a plurality of connecting members electrically connecting terminals of neighboring rechargeable batteries of the plurality of rechargeable batteries to each other; and
a shorting member configured to generate a short circuit by connecting neighboring connecting members of the plurality of connecting members to each other,
wherein the shorting member comprises a shorting plate contactable with the neighboring connecting members for generating the short circuit, and a driver coupled to the shorting plate and configured to move the shorting plate to contact the neighboring connecting members.

17. The battery module of claim 16, wherein the driver comprises a wrinkled plate arranged between the rechargeable batteries.

18. The battery module of claim 16, wherein the driver comprises a curved plate arranged between the rechargeable batteries.

19. The battery module of claim 16, wherein the driver comprises a bimetal or a shape memory alloy.

20. The battery module of claim 16, wherein:
the shorting member further comprises a hinge fixed to an outer portion of one of the rechargeable batteries, and
the driver is rotatable about the hinge.

* * * * *